(12) United States Patent
Koyama

(10) Patent No.: US 11,542,373 B2
(45) Date of Patent: Jan. 3, 2023

(54) METHOD FOR PRODUCING BIODEGRADABLE POLYESTER FILM FROM FATTY ACID AMIDE AND POLY(3-HYDROXYALKANOATE)

(71) Applicant: KANEKA CORPORATION, Osaka (JP)

(72) Inventor: Ryohei Koyama, Settsu (JP)

(73) Assignee: KANEKA CORPORATION, Osaka (JP)

( * ) Notice: Subject to any disclaimer, the term of this patent is extended or adjusted under 35 U.S.C. 154(b) by 527 days.

(21) Appl. No.: 16/497,614

(22) PCT Filed: Mar. 28, 2018

(86) PCT No.: PCT/JP2018/012817
§ 371 (c)(1),
(2) Date: Sep. 25, 2019

(87) PCT Pub. No.: WO2018/181500
PCT Pub. Date: Oct. 4, 2018

(65) Prior Publication Data
US 2020/0017641 A1    Jan. 16, 2020

(30) Foreign Application Priority Data
Mar. 29, 2017    (JP) .............................. JP2017-066248

(51) Int. Cl.
*C08J 3/22*    (2006.01)
*B29C 48/00*    (2019.01)
(Continued)

(52) U.S. Cl.
CPC ............. *C08J 3/22* (2013.01); *B29C 48/0018* (2019.02); *B29C 48/022* (2019.02); *C08J 5/18* (2013.01);
(Continued)

(58) Field of Classification Search
CPC ... C08J 3/22; C08J 5/18; C08J 2367/02; C08J 2467/02; C08J 2300/16; C08J 2367/04;
(Continued)

(56) References Cited

U.S. PATENT DOCUMENTS

2005/0119359 A1*   6/2005   Shelby ........................ C08J 5/18
                                                         521/50
2008/0142023 A1*   6/2008   Schmid ................... A61L 31/16
                                                         128/849
(Continued)

FOREIGN PATENT DOCUMENTS

CN    102597105 A  *  7/2012  ............. C08L 67/02
CN    104010787 A  *  8/2014  ........... B29C 41/003
(Continued)

OTHER PUBLICATIONS

Extended European Search Report dated Nov. 20, 2020 in European Patent Application No. 18775497.3, citing documents AA-AB and AO therein, 7 pages.
(Continued)

*Primary Examiner* — Joseph S Del Sole
*Assistant Examiner* — Guy F Mongelli
(74) *Attorney, Agent, or Firm* — Oblon, McClelland, Maier & Neustadt, L.L.P.

(57) ABSTRACT

Provided is a method with which a biodegradable polyester film containing polyhydroxyalkanoate can be stably produced by film blowing under practical processing conditions. A method for producing a biodegradable polyester film containing a biodegradable aliphatic polyester (A) and
(Continued)

a fatty acid amide (B) by film blowing, the biodegradable aliphatic polyester (A) containing polyhydroxyalkanoate, the method including: a step (I) of dry-blending the biodegradable aliphatic polyester (A) with a masterbatch containing the fatty acid amide (B) and a base material resin; and a step (II) of subjecting the mixture obtained in the step (I) to film blowing.

14 Claims, 1 Drawing Sheet

(51) Int. Cl.
 *C08J 5/18* (2006.01)
 *B29K 67/00* (2006.01)
 *B29L 23/00* (2006.01)

(52) U.S. Cl.
 CPC .... *B29K 2067/00* (2013.01); *B29K 2995/006* (2013.01); *B29L 2023/001* (2013.01); *C08J 2367/02* (2013.01); *C08J 2467/02* (2013.01)

(58) Field of Classification Search
 CPC ... C08J 2400/16; C08J 3/226; B29C 48/0018; B29C 48/022; B29K 2067/00; B29K 2995/006; B29L 2023/001; C08L 67/04; C08L 101/16
 See application file for complete search history.

(56) References Cited

U.S. PATENT DOCUMENTS

| | | | |
|---|---|---|---|
| 2011/0244985 A1* | 10/2011 | Harris | C08L 67/04 473/378 |
| 2012/0041109 A1 | 2/2012 | Krishnaswamy | |
| 2013/0029124 A1 | 1/2013 | Loos et al. | |
| 2013/0065042 A1* | 3/2013 | Esser-Kahn | B29C 67/202 428/389 |

FOREIGN PATENT DOCUMENTS

| | | | | |
|---|---|---|---|---|
| CN | 105400154 | * | 3/2016 | |
| CN | 105400154 A | * | 3/2016 | |
| CN | 105907061 | * | 8/2016 | |
| CN | 105907061 A | * | 8/2016 | C08J 3/203 |
| EP | 2913360 A1 | * | 9/2015 | C08K 5/053 |
| JP | 2004-244507 A | | 9/2004 | |
| JP | 2004-308016 A | | 11/2004 | |
| JP | 2007-56051 A | | 3/2007 | |
| JP | WO 2007/046174 A1 | | 4/2007 | |
| JP | 2007-277383 A | | 10/2007 | |
| WO | WO 2010/118041 A1 | | 10/2010 | |
| WO | WO-2010118041 A1 | * | 10/2010 | C08J 3/203 |

OTHER PUBLICATIONS

International Search Report dated Jun. 26, 2018 in PCT/JP2018/012817 filed Mar. 28, 2018.

* cited by examiner

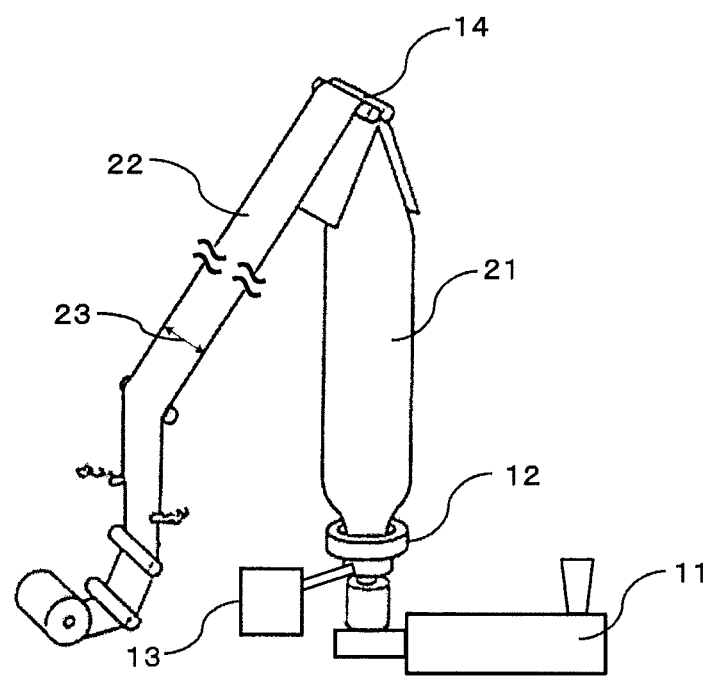

METHOD FOR PRODUCING BIODEGRADABLE POLYESTER FILM FROM FATTY ACID AMIDE AND POLY(3-HYDROXYALKANOATE)

TECHNICAL FIELD

The present invention relates to a method for producing a biodegradable polyester film.

BACKGROUND ART

In recent years, there has arisen the problem that plastic waste heavily affects the global environment by impacts on the ecosystems, generation of harmful gases during combustion, global warming caused by an enormous amount of heat in combustion, and the like, and development of biodegradable plastics has become active as a solution to the problem. In particular, biodegradable plastics which are produced from plant-derived raw materials do not cause an increase in the amount of carbon dioxide in the atmosphere because carbon dioxide generated in combustion of the biodegradable plastics originates in the air. This concept is called carbon neutrality, and is considered important and encouraged to be positively accepted under the Kyoto Protocol in which carbon dioxide reduction targets are specified.

Recently, in the context of biodegradability and carbon neutrality, attention has been paid to biodegradable aliphatic polyester resins as plant-derived plastics, and in particular, polyhydroxyalkanoate-based resins (hereinafter, sometimes referred to as PHA) have been attracted attention. Among PHA-based resins, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins (hereinafter, sometimes referred to as P3HB4HB), polylactic acid (hereinafter, sometimes referred to as PLA) and the like have attracted attention.

For example, PTL 1 discloses a polymer alloy of two types of polyester-based biodegradable polymers. Specifically, polybutylene succinate and poly (butylene succinate/adipate) are disclosed as the biodegradable polymer.

CITATION LIST

Patent Literature

PTL 1: Japanese Patent Laid-Open Publication No. 2004-244507

SUMMARY OF INVENTION

Technical Problem

However, use of the above-mentioned PHA (particularly P3HA described later) as a biodegradable aliphatic polyester resin has the problem that moldability and productivity are deteriorated because even when the amount of the resin used is small, the processing-allowable temperature range in film blowing of a film is significantly narrower as compared to a general-purpose resin (for example a polyester-based biodegradable polymer used in PTL 1).

Thus, an object of the present invention is to provide a method with which a biodegradable polyester film containing polyhydroxyalkanoate can be stably produced by film blowing under practical processing conditions.

Solution to Problem

The present inventor has extensively conducted studies for solving the above-described problems, and resultantly found that with a method including a specific step as an essential step, a biodegradable polyester film containing polyhydroxyalkanoate can be stably produced by film blowing under practical processing conditions, achieving the present invention.

Specifically, the present invention provides the following inventions.

[1] A method for producing a biodegradable polyester film containing a biodegradable aliphatic polyester (A) and a fatty acid amide (B) by film blowing,
the biodegradable aliphatic polyester (A) containing polyhydroxyalkanoate,
the method including:
a step (1) of dry-blending the biodegradable aliphatic polyester (A) with a masterbatch containing the fatty acid amide (B) and a base material resin; and
a step (II) of subjecting the mixture obtained in the step (I) to film blowing.

[2] The method according to [1], in which the biodegradable polyester film further contains an aliphatic-aromatic polyester (C).

[3] The method according to [1] or [2], in which the base material resin present in the masterbatch is at least one selected from the group consisting of the biodegradable aliphatic polyester (A) and the aliphatic-aromatic polyester (C) The manufacturing method of the biodegradable polyester film as described.

[4] The method according to any one of [1] to [3], in which the fatty acid amide (B) is erucic acid amide.

[5] The method according to any one of [1] to [4], in which a content of the fatty acid amide (B) in the masterbatch is 5 to 20% by weight.

[6] The method according to any one of [2] to [5], in which a content of the fatty acid amide (B) in the biodegradable polyester film is 0.1 to 3 parts by weight based on 100 parts by weight of a total of the biodegradable aliphatic polyester (A) and the aliphatic-aromatic polyester (C).

[7] The method according to any one of [2] to [6], in which the aliphatic-aromatic polyester (C) is at least one selected from the group consisting of poly(butylene adipate-co-butylene terephthalate) (PBAT) and poly(butylene succinate-co-butylene terephthalate) (PBST).

[8] The method according to any one of [1] to [7], in which a ratio (weight ratio) of the biodegradable aliphatic polyester (A) to the aliphatic-aromatic polyester (C) [biodegradable aliphatic polyester (A)/aliphatic-aromatic polyester (C)] in the biodegradable polyester film is 100/0 to 30/70.

[9] The method according to any one of [1] to [8], in which a content of the polyhydroxyalkanoate in the biodegradable polyester film is 20 to 99% by weight.

Advantageous Effects of Invention

According to the present invention, a biodegradable polyester film containing polyhydroxyalkanoate having a narrower processing-allowable temperature range, lower productivity and poorer capability of film molding as compared to a general-purpose resin can be stably produced by film blowing under practical conditions.

BRIEF DESCRIPTION OF DRAWINGS

FIG. 1 is a schematic diagram illustrating film blowing performed in each example.

DESCRIPTION OF EMBODIMENTS

A method for producing a biodegradable polyester film according to the present invention (sometimes referred to as "the inventive production method") is a method for producing a biodegradable polyester film containing a biodegradable aliphatic polyester (A) and a fatty acid amide (B) as essential components by film blowing, the biodegradable aliphatic polyester (A) containing polyhydroxyalkanoate as an essential component, the method including the following steps (I) and (II) as essential steps.

Step (I): dry-blending a biodegradable aliphatic polyester (A) with a masterbatch containing a fatty acid amide (B) and a base material resin.

Step (II): subjecting the mixture obtained in the step (I) to film blowing.

The biodegradable polyester film produced by the production method of the present invention may be referred to as "the inventive film".

[Biodegradable Aliphatic Polyester (A)]

The biodegradable aliphatic polyester (A) by the inventive production method is an aliphatic polyester which is biodegradable (polyester which does not contain an aromatic ring), and examples thereof include polyesters having a structure in which an aliphatic hydroxycarboxylic acid is polymerized and condensed; and polyesters having a structure in which an aliphatic diol and an aliphatic dicarboxylic acid are polymerized and condensed. Examples of the former polyesters include polyhydroxyalkanoates such as poly (a-hydroxyalkanoate) and poly(3-hydroxyalkanoate) (P3HA), and examples of the latter polyesters include polyethylene succinate, polybutylene succinate (PBS), polyhexamethylene succinate, polyethylene adipate, polybutylene adipate, polyhexamethylene adipate, polybutylene succinate adipate (PBSA), polyethylene sebacate and polybutylene sebacate. In particular, the biodegradable aliphatic polyester (A) is preferably a polyester having a structure in which an aliphatic hydroxycarboxylic acid is polymerized, and especially preferably P3HA.

Among them, the biodegradable aliphatic polyester (A) contains polyhydroxyalkanoate. The polyhydroxyalkanoate is a polymer containing hydroxyalkanoate (hydroxyalkanoic acid) as a monomer component, and examples thereof include poly(a-hydroxyalkanoate) and P3HA as described above.

Examples of the poly (α-hydroxyalkanoate) include polylactic acid and polyglycolic acid. The polylactic acid may be a homopolymer of L-lactic acid, a homopolymer of D-lactic acid, a copolymer of L-lactic acid and D-lactic acid, or a stereo complex of poly(L-lactic acid), poly(D-lactic acid) or the like.

P3HA is polyhydroxyalkanoate containing 3-hydroxyalkanoic acid repeating units represented by the general formula [—CHR—CH$_2$—CO—O—] (wherein R is an alkyl group represented by C$_n$H$_{2n+1}$, n is an integer of 1 or more and 15 or less). In particular, the ratio of the repeating units to all monomer repeating units (100 mol %) is preferably 50 mol % or more, more preferably 70 mol % or more. More specifically, examples of P3HA include poly(-hydroxybutyrate) (P3HB), poly(-hydroxybutyrate-co-3-hydroxyvalerate) (P3HB3HV), poly(3-hydroxybutyrate-co-3-hydroxyhexanoate) (P3HB3HH), poly(3-hydroxybutyrate-co-3-hydroxyvalerate-co-3-hydroxyhexanoate) (P3HB3HV3HH), poly (3-hydroxybutyrate-co-4-hydroxybutyrate) (P3HB4HB), poly (3-hydroxybutyrate-co-3-hydroxyoctanoate) and poly(3-hydroxybutyrate-co-3-hydroxydecanoate).

P3HA may be one that is chemically synthesized (for example, one obtained by ring-opening polymerization of the corresponding lactone), or one that is produced by microorganisms, but P3HA produced by microorganisms is preferable. P3HA produced by microorganisms (microbiologically produced P3HA) is usually P3HA composed only of polyhydroxyalkanoate monomer units of D-form (R-form). The microbiologically produced P3HA is preferably P3HB, P3HB3HH, P3HB3HV, P3HB3HV3HH or P3HB4HB from the viewpoint of ease of industrial production.

When P3HA (particularly microbiologically produced P3HA) contains 3-hydroxybutanoic acid (3HB) repeating units as essential monomer units, the P3HA has such a monomer composition ratio that the composition ratio of 3-hydroxybutanoic acid (3HB) repeating units to all repeating units (100 mol %) is preferably 80 to 99 mol %, more preferably 85 to 97 mol %. When the composition ratio of 3HB repeating units is 80 mol % or more, the rigidity of P3HA is further improved, and the degree of crystallinity is not excessively low, which tends to facilitate purification. On the other hand, when the composition ratio of 3HB repeating units is 99 mol % or less, flexibility tends to be further improved. The monomer composition ratio of P3HA can be measured by gas chromatography or the like (see, for example, WO No. 2014/020838).

The microorganism which produces microbiologically produced PHA is not particularly limited as long as it is a microorganism capable of producing PHAs. For example, the first P3HB-producing bacterium is Bacillus megaterium discovered in 1925, and in addition, natural microorganisms such as Cupriavidus necator (former class name: Alcaligenes eutrophus), Ralstonia eutropha and Alcaligenes latus are known. In these microorganisms, PHB is accumulated in the cells.

Further, as bacteria producing copolymers of hydroxybutyrate and other hydroxyalkanoates, P3HB3HV and P3HB3HH producing bacteria such as Aeromonas caviae, P3HB4HB producing bacteria such as Alcaligenes eutrophus and the like are known. In particular, with regard to P3HB3HH, the Alcaligenes eutrophus AC32 strain (Alcaligenes eutrophus AC32, FERM BP-6038) into which a PHA synthetase group gene has been introduced in order to enhance the productivity of P3HB3HH (T. Fukui, Y Doi, J. Bateriol, 179, p 4821-4830 (1997)) and the like are more preferable, and microbial cells obtained by culturing these microorganisms under appropriate conditions to accumulate P3HB3HH in the cells are used. Besides the above-described microorganisms, genetically modified microorganisms into which various PHA synthesis-related genes have been introduced may be used in conformity to PHA to be produced, or culture conditions including the type of substrate may be optimized.

The molecular weight of the biodegradable aliphatic polyester (A) is not particularly limited as long as it exhibits substantially sufficient physical properties in the intended application, and the weight average molecular weight of the polyester (A) is preferably 50,000 to 3,000,000, more preferably 100,000 to 1,000,000. When the weight average molecular weight is 50,000 or more, the strength of the biodegradable polyester film tends to be further improved. On the other hand, when the weight average molecular weight is 3,000,000 or less, processability tends to be further improved, leading to easier molding.

In the method for measuring the weight average molecular weight, a gel permeation chromatograph (GPC) ("Shodex GPC-101" manufactured by Showa Denko K.K.) is used, a polystyrene gel ("Shodex K-804" manufactured by Showa Denko K.K.) is used as a column, chloroform is used as a mobile phase, and a molecular weight in terms of polystyrene is determined. Here, a calibration curve is prepared using polystyrene having a weight average molecular weight of 31,400, 197,000, 668,000 and 1,920,000. As a column in the GPC, a column suitable for measuring the molecular weight may be used.

As the biodegradable aliphatic polyester (A) in the inventive production method, one PHA can be used singly, or two or more PHAs can be used in combination, or one or more PHAs can be used in combination with one or more biodegradable aliphatic polyesters other than PHAs.

The amount of the biodegradable aliphatic polyester (A) used in the inventive production method (the content of the biodegradable aliphatic polyester (A) in the inventive film) is preferably 20 to 99% by weight, more preferably 30 to 80% by weight, still more preferably 40 to 60% by weight based on the total amount (100% by weight) of the film. When the amount of the polyester (A) used (the content of the polyester (A)) is 20% by weight or more, the film tends to effectively develop biodegradability.

The amount of the polyhydroxyalkanoate used in the inventive production method (the content of the polyhydroxyalkanoate in the inventive film) is preferably 20 to 99% by weight, more preferably 35 to 80% by weight, still more preferably 40 to 60% by weight based on the total amount (100% by weight) of the film.

Generally, in production of a biodegradable polyester film by film blowing, capability of film molding tends to be significantly deteriorated particularly when the P3HA is used as the film raw material. The inventive production method enables film blowing to be performed with favorable moldability even when P3HA is used as the biodegradable aliphatic polyester (A), so that it is possible to produce the film under the practical processing conditions. That is, in the present invention, benefits of the effect of the present invention can be obtained particularly when P3HA is used as the biodegradable aliphatic polyester (A).

[Fatty Acid Amide (B)]

Examples of the fatty acid amide (B) used in the inventive production method include monoamides of fatty acids and bisamides of fatty acids. The fatty acid (fatty acid moiety) that forms the fatty acid amide (B) is preferably a fatty acid having 12 to 30 carbon atoms, more preferably a fatty acid having 18 to 22 carbon atoms from the viewpoint of attaining a moderately high melting point and suppressing deterioration of processability during melt processing. Examples of the fatty acid include higher fatty acids such as erucic acid, palmitic acid and oleic acid. Specific examples of the fatty acid amide (B) include erucic acid amide, palmitic acid amide, oleic acid amide, stearic acid amide, methylenebisstearic acid amide, ethylenebisstearic acid amide, ethylenebisoleic acid amide and ethylenebiserucic acid amide. Among these, erucic acid amide is preferable.

In the inventive production method, one fatty acid amide (B) can be used alone, or two or more fatty acid amides (B) can be used in combination.

The amount of the fatty acid amide (B) used in the inventive production method (the content of the fatty acid amide (B) in the inventive film) is preferably 0.1 to 3 parts by weight, more preferably 0.2 to 2.5 parts by weight based on 100 parts by weight of the total of the biodegradable aliphatic polyester (A) and the aliphatic-aromatic polyester (C) blended in the present invention. The content can also be replaced with the total amount of the fatty acid amide (B) blended in the inventive production method. When the content is 0.1 parts by weight or more, the processing-allowable temperature range over which a balloon can be stably produced during film blowing tends to be widened. Further, the openability of the biodegradable polyester film tends to be improved. On the other hand, when the content is 3 parts by weight or less, the bleed-out of the fatty acid amide (B) to the film surface tends to be suppressed, leading to further suppression of defects at the time of winding the film (for example, a situation in which at the time of winding the film, the film slides, cannot be appropriately wound, and creases, or the ends of the film are not aligned, or the film slides on a roll in the production line and cannot be appropriately wound).

[Aliphatic-aromatic polyester (C)]

In the inventive production method, the aliphatic-aromatic polyester (C) can be used in addition to the biodegradable aliphatic polyester resin (A) and fatty acid amide (B). That is, the inventive film may further contain the aliphatic-aromatic polyester (C). Use of the aliphatic-aromatic polyester (C) tends to further improve capability of film molding and further improve the mechanical properties of the film. Aliphatic-aromatic polyester (C) is a polyester having both an aliphatic compound and an aromatic compound as monomers, and examples thereof include poly (butylene adipate-co-butylene terephthalate) (PBAT), poly (butylene sebacate-co-butylene terephthalate), poly (butylene azelate-co-butylene terephthalate) and poly (butylene succinate-co-butylene terephthalate) (PBST). Among them, PBAT and PBST are preferable.

As described above, PBAT refers to a random copolymer of 1,4-butanediol, adipic acid and terephthalic acid, and in particular, PBAT obtained by reacting (b) a butanediol-containing mixture with (a) a mixture mainly composed of 35 to 95 mol % of adipic acid or an ester-forming derivative thereof or a mixture thereof and 5 to 65 mol % of terephthalic acid or an ester-forming derivative thereof or a mixture thereof (the sum of the amounts (mol %) of the individual components is 100 mol %) (the ratio of the (a) mixture to the (b) mixture is 0.4:1 to 1.5:1) as described in National Publication of International Patent Application No. 10-508640 or the like is preferable. Examples of commercially available products of PBAT include "Ecoflex F blend C1200" (registered trademark) manufactured by BASF Co. Further, PBST is a copolymer in which the moiety of adipic acid or an ester-forming derivative thereof in PBAT is replaced by sebacic acid or an ester-forming derivative thereof, and examples of commercial products of PBST include "Ecoflex FS blend B1100" (registered trademark) manufactured by BASF Co. In the inventive production method, one aliphatic-aromatic polyester (C) can be used alone, or two or more aliphatic-aromatic polyesters (C) can be used in combination.

The amount of the aliphatic-aromatic polyester (C) used in the inventive production method is preferably 0 to 900 parts by weight, more preferably 10 to 500 parts by weight, still more preferably 40 to 250 parts by weight based on 100 parts by weight of the biodegradable aliphatic polyester (A). When the amount of the aliphatic-aromatic polyester (C)

used is 900 parts by weight or less, efficient biodegradability which is a benefit of biodegradable aliphatic polyester tends to be developed. On the other hand, when the amount of the aliphatic-aromatic polyester (C) used is 10 parts by weight or more, capability of film molding and the mechanical properties of the resulting film tend to be further improved. The ratio (weight ratio) of the biodegradable aliphatic polyester (A) to the aliphatic-aromatic polyester (C) [biodegradable aliphatic polyester (A)/aliphatic-aromatic polyester (C)] in the inventive film is preferably 100/0 to 20/80, more preferably 100/0 to 30/70, still more preferably 80/20 to 50/50. When the ratio is within the above-described range, balloon stability during film blowing tends to be further improved.

[Other Components]

In the inventive production method, other components can also be used as raw materials for the biodegradable polyester film. For example, an organic or inorganic filler and the like can be used as long as the effect of the present invention is not hindered. In particular, from the viewpoint of biodegradability and carbon neutrality of the resulting film, for example, naturally derived materials such as wood-based materials such as wood chips, wood flour and sawdust, rice husk, rice flour, starch, corn starch, rice straw, straw and natural rubber are preferable. The amount of the organic or inorganic filler blended can be appropriately set. One organic or inorganic filler can be used alone, or two or more organic or inorganic fillers can be used in combination.

In addition to the organic or inorganic fillers described above, one or more of fillers to be used as usual additives, colorants such as pigments and dyes, odor absorbing agents such as activated carbon and zeolite, perfumes such as vanillin and dextrin, oxidation preventing agents, antioxidants, weatherability improvers, UV absorbers, lubricants, mold release agents, water repellents, antibacterial agents, slide improvers, and other secondary additives can also be used as long as the effect of the present invention is not hindered. The amounts of the additives blended can be appropriately set.

The inventive production method is a method for producing a biodegradable polyester film including the step (I) and the step (II) as essential steps as described above.

[Step (I)]

The step (I) is a step of dry-blending a biodegradable aliphatic polyester (A) with a masterbatch containing a fatty acid amide (B) and a base material resin. By feeding the masterbatch into a molding machine together with the biodegradable aliphatic polyester (A), thermal degradation of the biodegradable aliphatic polyester (A) (particularly thermal degradation due to shear heat generation at a die lip) is suppressed, and thus a stable balloon can be maintained in film blowing, so that high productivity can be achieved. A film excellent in mechanical strength, for example tensile properties and tear properties tends to be obtained probably because orientation of molecular chains due to shear is suppressed.

The masterbatch of the fatty acid amide (B) is composed of the fatty acid amide (B) and a base material resin. The base material resin is not particularly limited as long as it is a resin which has favorable compatibility with the biodegradable aliphatic polyester (A) and other constituent resins of the film (for example, aliphatic-aromatic polyester (C)), and does not impair the appearance and the mechanical properties of a molded article. From the above-described point of view, the base material resin is preferably one or two or more selected from the group consisting of biodegradable aliphatic polyester (A) and the aliphatic-aromatic polyester (C).

The masterbatch may contain, for example, the above-mentioned other components and the like in addition to the fatty acid amide (B) and the base material resin.

The content of the fatty acid amide (B) in the masterbatch is not particularly limited, but is preferably 5 to 20% by weight, more preferably 7 to 12% by weight based on the total amount (100% by weight) of the masterbatch. When the content of the fatty acid amide is 5% by weight or more, balloon stability during film blowing tends to be further improved. On the other hand, when the content of the fatty acid amide (B) is 20% by weight or less, kneading failure tends to be suppressed, and deterioration of printability or winding failure due to excessive bleed-out of the fatty acid amide (B) to the surface of the molded film tends to be suppressed.

Dry-blending of the masterbatch of the fatty acid amide (B) with the biodegradable aliphatic polyester (A) is usually performed at a temperature lower than a temperature at which the resin used is melted. That is, the dry-blending means mixing in a non-melted state. When components other than the biodegradable aliphatic polyester (A) are used in the inventive production method, the biodegradable aliphatic polyester (A) and the components other than the component (A) may be combined by melt-kneading using an extruder or the like before the step (II), or the components other than the component (A) may be dry-blended with the masterbatch of the fatty acid amide (B) and the biodegradable aliphatic polyester (A) in the step (I). In the latter case, the components other than the biodegradable aliphatic polyester (A) are combined with the biodegradable aliphatic polyester (A) in a film blowing machine in step (II).

The amount of the masterbatch used can be appropriately set in consideration of the content of the fatty acid amide (B) in the film, the content of the fatty acid amide (B) in the masterbatch, and the like.

[Step (II)]

The step (II) is a step of subjecting the mixture obtained in the step (I) to film blowing. The film blowing refers to a method for molding a film in which a molten resin is extruded in a tubular form from an extruder having a cylindrical die attached to the tip thereof, and immediately thereafter, a gas is injected into the tube to expand the tube in a balloon form, whereby a film is molded. The method for film blowing is not particularly limited, and it is possible to carry out the method using a general film blowing machine which is used for molding a thermoplastic resin into a film. The general film blowing machine is one having a cylindrical die attached to a single-screw extruder. The screw shape or the like of the single-screw extruder is not particularly limited as long as an introduced raw material resin is melted and kneaded, and discharged at a certain rate while being kept at a desired temperature, but a single-screw extruder including a mixing element is preferable from the viewpoint of kneading properties. Further, the structure of the cylindrical die is not particularly limited, but in particular, a spiral mandrel die is preferable because generation of welds is small and the thickness is easily made uniform.

The molding temperature in film blowing is not particularly limited as long as the resin can be appropriately melted, but the molding temperature is preferably 135 to 200° C. The molding temperature mentioned here refers to a resin temperature after the resin is introduced into the extruder and before the resin is discharged from the die. In general, the resin temperature can be measured by, for example, a thermometer installed on an adapter. When the resin temperature is lower than 135° C., unmelted resin may be generated to cause occurrence of fish eyes in the molded film, resulting in poor appearance. On the other hand, when the resin temperature is higher than 200° C., the resin may be thermally degraded easily, and turned into a burnt resin, leading to poor appearance, balloon stability may be deteriorated, or the mechanical properties of the molded film may be deteriorated.

The take-up speed in film blowing is determined by the film thickness, width and the amount of resin discharged, and can be adjusted within a range over which balloon stability can be maintained. In general, the take-up speed is preferably 1 to 50 m/min.

In film blowing, an air ring sprayed from the outside of the balloon is used for solidifying the discharged molten resin to stabilize the balloon. An air ring spraying structure that is suitably used is a slit-type structure in which a plurality of annular slits through which air is sprayed is provided, and stabilization of the balloon is promoted by chambers between the slits.

The inventive production method may include steps other than the step (I) and the step (II). Examples of other steps include a step of taking a tubular molded film to a take-up roll in a state of being folded with a pinch roll, and a step of cutting the film in accordance with a use purpose during take-up of the film. Examples of the cutting method include a method in which a folded tubular molded film is cut at both ends to form two films; and a method in which a tubular molded film is hot-cut at the center thereof, and simultaneously welding is performed to form two bag-shaped films. Further, the method may include a step of spraying air to the interface of the folded film immediately before cutting in order to facilitate the cutting. Further, as one of methods for forming a bag, the method may include a step of performing so-called gusset folding in which a tubular film in a state of being folded is folded inward at both ends.

By the inventive production method, a biodegradable polyester film is obtained. The thickness of the film is not particularly limited, but is preferably 5 to 100 μm, more preferably 10 to 70 μm.

The use purpose of the inventive film is not particularly limited, and the film can be preferably used in the fields of agriculture, fishery, forestry, horticulture, medicine, hygiene products, food industry, clothing, non-clothing, packaging, automobiles and building materials, and other fields. More specifically, the inventive film is used in, for example, agricultural multi films, fumigation sheets for forestry, bundling tapes including flat yarns, root wound films of plants, back sheets for diapers, sheets for packaging, shopping bags, trash bags, and drainage bags, as well as compost bags.

EXAMPLES

Hereinafter, the present invention will be described in more detail on the basis of examples, but the present invention is not limited to these examples.

The following raw materials were used in examples.
(Aliphatic Polyester)

A-1: Poly(3-hydroxybutyrate-co-3-hydroxyhexanoate (P3HB3HH) obtained in accordance with the method described in WO No. 2013/147139 and having a 3-hydroxyhexanoate (3HH) content of 11.2 mol % and a weight average molecular weight of 570,000 as measured by GPC was pelletized by the following method (cylindrical pellets; average diameter: 3 mm and length: 3.3 mm). Pelletization was performed by melting and kneading the resin at a set temperature of 120 to 130° C. and a screw rotational speed of 100 rpm in a co-directional meshing-type twin-screw extruder (TEM 26ss manufactured by Toshiba Machine Co., Ltd.), and cutting the strand.

A-2: P3HB3HH obtained in accordance with the method described in WO No. 2008/010296 and having a 3HH content of 5.4 mol % and a weight average molecular weight of 620,000 as measured by GPC which having a composition of 5.4 mol % in 3HH and a weight average molecular weight of 620,000 as measured by GPC was pelletized by the same method as in preparation of the aliphatic polyester A-1 (cylindrical pellets).

(Fatty Acid Amide or Masterbatch Thereof)

B-1: TEP BP SL1 manufactured by Tokyo Printing Ink MFG Co., Ltd. (masterbatch of erucic acid amide; PBAT/erucic acid amide=90/10 (weight ratio)).

B-2: Neutron-S manufactured by Nippon Seika Co., Ltd. (erucic acid amide).

B-3: Masterbatch pellets (P3HB3HH/erucic acid amide=80/20 (weight ratio)) obtained by adding B-2 (Neutron-S) to a concentration of 20% by weight at the time of pelletization in preparation of the aliphatic polyester A-1.

(Aliphatic-Aromatic Polyester)

C-1: BASF Ecoflex F blend C1200 (manufactured by PBAT Co.)

Example 1

(Production of Biodegradable Polyester Film)

The aliphatic-polyester A-1, the masterbatch B-1 of fatty acid amide and the aliphatic-aromatic polyester C-1 were dry-blended at a blending ratio as shown in Table 1. The obtained mixture was introduced into a film blowing machine (manufactured by Hokushinsangyo Corporation) in which a die equipped with a cylindrical die slip of 100 mm in diameter was connected to an extruder having a single screw of L/D=32. The mixture was extruded at extruder set temperatures of 125-135° C. (C1: 125° C., C2: 130° C. and C3: 135° C.), adapter and die set temperatures of 140° C., screw rotation speed of 12 rpm and a die gap of 1 mm to form a balloon expanded to a blowup ratio of 2.7 (final folding width: 420 mm), and the balloon was taken up at a speed of 8 m/min with a cooling roll (pinch roll) controlled to a temperature of 40° C. while cooling air controlled to a temperature of 30° C. was applied to the balloon. In this way, a 20 μm-thick film was obtained. Here, the temperature indicated by a resin thermometer installed in the adapter section was 140° C.

Further, with the film blowing conditions as initial conditions, the set temperatures of the extruder, the adapter and the die were gradually raised until the balloon became unstable (rated "poor") in the following balloon stability evaluation, and the temperature range allowing balloon stability to be secured (processing-allowable temperature range) was evaluated. The evaluation results are shown in Table 1.

(Balloon Stability Evaluation)

"good": The variation in folding width is less than 20 mm per 20 m of the length of the obtained film.

"poor": The variation in folding width is 20 mm or more per 20 m of the length of the obtained film, or a film cannot be taken due to breakage or extreme deformation of the balloon.

When a balloon-shaped molded film 21 extruded from a die 12 is caused to pass through a cooling roll (pinch roll) 14, so that the film is folded to form a twofold film 22 as shown in FIG. 1, the folding width is a width 23 of the twofold film.

When variation in folding width increases, the variation in thickness accordingly increases, so that it becomes difficult to maintain the cylindrical shape (that is, it becomes difficult to stably form a balloon).

Examples 2 to 6

Except that the blending amounts and the materials blended were changed as shown in Table 1, the same procedure as in Example 1 was carried out to produce biodegradable polyester films. Further, balloon stability was evaluated in the same manner as in Example 1. The evaluation results are shown in Table 1.

Comparative Examples 1, 2 and 4

Except that the blending amounts and the materials blended were changed as shown in Table 1, the same procedure as in Example 1 was carried out to produce biodegradable polyester films. Further, balloon stability was evaluated in the same manner as in Example 1. The evaluation results are shown in Table 1.

Comparative Example 3

In Comparative Example 3, raw materials for forming a biodegradable polyester film were melted and kneaded to obtain pellets, and film blowing was then performed using the obtained pellets. That is, a mixture obtained by dry-blending the aliphatic polyester A-1 and the aliphatic-aromatic polyester C-1, and the powdered fatty acid amide B-2 were fed into a co-directional meshing-type twin-screw extruder (TEM 26ss manufactured by Toshiba Machine Co., Ltd.) through a feeder 1 and a feeder 2 (feeder different from the feeder 1), respectively, and melted and kneaded at a set temperature of 140° C. and a screw rotational speed of 100 rpm, and the strand was cut to obtain pellets.

The pellets thus obtained were fed into a film blowing machine, and a biodegradable polyester film was produced under the same conditions as in Example 1. Further, balloon stability was evaluated in the same manner as in Example 1. The evaluation results are shown in Table 1.

TABLE 1

| | Composition of biodegradable polyester film | | | | | | | Balloon stability during film blowing | |
|---|---|---|---|---|---|---|---|---|---|
| | Aliphatic polyester (A) | | Fatty acid amide (B) or masterbatch thereof | | Aliphatic-aromatic polyester (C) | | Total amount of aliphatic acid amide (B) wt % | Processing-allowable temperature range (° C.) | Processing-allowable temperature range (° C.) |
| | Type | Blending amount (parts by weight) | Type | Blending amount (parts by weight) | Type | Blending amount (parts by weight) | | | |
| Example 1 | A-1 | 50 | B-1 | 10 | C-1 | 40 | 1 | 15 | 140-155 |
| Example 2 | A-1 | 50 | B-1 | 20 | C-1 | 30 | 2 | 20 | 140-160 |
| Example 3 | A-1 | 50 | B-3 | 5 | C-1 | 45 | 1 | 10 | 140-150 |
| Comparative Example 1 | A-1 | 50 | — | 0 | C-1 | 50 | 0 | 0 | — |
| Comparative Example 2 | A-1 | 50 | B-2 | 1 | C-1 | 49 | 1 | 0 | — |
| Example 4 | A-1 | 50 | B-1 | 35 | C-1 | 15 | 3.5 | 20 | 140-160 |
| Comparative Example 3 | A-1 | 50 | B-2 | 1 | C-1 | 49 | 1 | 0 | — |
| Example 5 | A-1 | 20 | B-1 | 10 | C-1 | 70 | 1 | 25 | 140-165 |
| Example 6 | A-2 | 80 | B-3 | 20 | — | 0 | 2 | 10 | 145-155 |
| Comparative Example 5 | A-1 | 20 | — | 0 | C-1 | 80 | 0 | 15 | |
| Comparative Example 4 | A-2 | 100 | — | 0 | — | 0 | 0 | <5 | 148-152 |

A-1: PHBH obtained in accordance with method described in WO 2013/147139 and having a 3-hydroxyhexanoate (3HH) of 11.2 mol %
A-2: PHBH obtained in accordance with method described in WO 2008/010296 and having a 3-hydroxyhexanoate (3HH) of 5.4 mol %
B-1: TEP BP SL1 "masterbatch: PBAT/erucic acid amide = 90/10, manufactured by Tokyo Printing Ink MFG Co., Ltd.
B-2: Neutron-S [erucic amide, manufactured by Nippon Seika Co., Ltd.]
B-3: Masterbatch obtained by adding 20% of Neutron-S (manufactured by Nippon Seika Co., Ltd.) to A-1
C-1: Ecoflex C1200 [poly(butylene adipate-co-butylene terephthalate), manufactured by BASF Co.

As indicated by the results in Table 1, Examples 1 to 6 in which film blowing was performed after the masterbatch of the fatty acid amide (B) and the biodegradable aliphatic polyester (A) were dry-blended showed a wide processing-allowable temperature range and favorable balloon stability. On the other hand, Comparative Examples 1 and 4 in which the masterbatch of the fatty acid amide (B) was not blended, Comparative Example 2 in which film blowing was performed after the powdered fatty acid amide itself rather than the masterbatch of the fatty acid amide (B) was dry-blended, and Comparative Example 3 in which film blowing was performed after the raw materials were melted and kneaded showed a much narrower processing-allowable temperature range and poorer balloon stability as compared to Examples 1 to 6.

In Example 4, the processing-allowable temperature range was wide, but the film slid with itself at the time of winding, so that the film was shifted at end portions, and creased, and thus there was room for improvement in terms of winding properties. On the other hand, in Examples 1 to 3 and 5 and 6, the above-mentioned problems at the time of winding did not occur.

As indicated in Table 1, the effect of the present invention was obtained in all examples regardless of the ratio of the biodegradable aliphatic polyester (A) to the aliphatic-aromatic polyester (C).

REFERENCE SIGNS LIST 11 extruder
12 die
13 cooling air feeder
14 cooling roll (pinch roll)
21 balloon-shaped molded film
22 twofold film
23 width (folding width) of twofold film

The invention claimed is:

1. A method for producing a biodegradable polyester film, comprising:
dry-blending a biodegradable aliphatic polyester (A) with a masterbatch comprising a fatty acid amide (B) and a base material resin; and
subjecting the dry-blended mixture to film blowing,
wherein in the dry-blending of the biodegradable aliphatic polyester (A) with the masterbatch, the biodegradable aliphatic polyester (A) and the masterbatch are mixed in a non-melted state,
the biodegradable aliphatic polyester (A) comprises poly(3-hydroxyalkanoate) and does not have an aromatic ring, and
the biodegradable polyester film comprises the biodegradable aliphatic polyester (A) and the fatty acid amide (B); wherein a content of the poly(3-hydroxyalkanoate) in the biodegradable polyester film is from 20 to 99% weight.

2. The method according to claim 1, wherein the biodegradable polyester film further comprises an aliphatic-aromatic polyester (C).

3. The method according to claim 2, wherein the base material resin in the masterbatch is at least one selected from the group consisting of the biodegradable aliphatic polyester (A) and the aliphatic-aromatic polyester (C).

4. The method according to claim 1, wherein the fatty acid amide (B) is erucic acid amide.

5. The method according to claim 1, wherein a content of the fatty acid amide (B) in the masterbatch is 5 to 20% by weight.

6. The method according to claim 2, wherein a content of the fatty acid amide (B) in the biodegradable polyester film is 0.1 to 3 parts by weight based on 100 parts by weight of a total content of the biodegradable aliphatic polyester (A) and the aliphatic-aromatic polyester (C).

7. The method according to claim 2, wherein the aliphatic-aromatic polyester (C) is at least one selected from the group consisting of poly(butylene adipate-co-butylene terephthalate) (PBAT) and poly(butylene succinate-co-butylene terephthalate) (PBST).

8. The method according to claim 2, wherein a weight ratio of the biodegradable aliphatic polyester (A) to the aliphatic-aromatic polyester (C) [biodegradable aliphatic polyester (A)/aliphatic-aromatic polyester (C)] in the biodegradable polyester film is greater than 100/0 and 20/80 or less.

9. The method according to claim 1, wherein the dry-blending is performed such that all components are not melted.

10. The method according to claim 1, wherein the poly(3-hydroxyalkanoate) is at least one selected from the group consisting of poly(3-hydroxybutyrate) (P3HB), poly(3-hydroxybutyrate-co-3-hydroxyvalerate) (P3HB3HV), poly(3-hydroxybutyrate-co-3-hydroxyhexanoate) (P3HB3HH), poly(3-hydroxybutyrate-co-3-hydroxyvalerate-co-3-hydroxyhexanoate) (P3HB3HV3HH), poly(3-hydroxybutyrate-co-4-hydroxybutyrate) (P3HB4HB), poly(3-hydroxybutyrate-co-3-hydroxyoctanoate) and poly(3-hydroxybutyrate-co-3-hydroxydecanoate).

11. The method according to claim 1, wherein the content of the poly(3-hydroxyalkanoate) in the biodegradable polyester film is 35 to 80% by weight.

12. The method according to claim 1, wherein the fatty acid amide (B) is at least one selected from the group consisting of erucic acid amide, palmitic acid amide, oleic acid amide, stearic acid amide, methylenebisstearic acid amide, ethylenebisstearic acid amide, ethylenebisoleic acid amide and ethylenebiserucic acid amide.

13. The method according to claim 1, wherein a content of the fatty acid amide (B) in the biodegradable polyester film is 0.1 to 3 parts by weight based on 100 parts by weight of a content of the biodegradable aliphatic polyester (A).

14. The method according to claim 1, wherein the base material resin in the masterbatch comprises the biodegradable aliphatic polyester (A).

* * * * *